(12) United States Patent
Bourgart et al.

(10) Patent No.: US 7,110,409 B1
(45) Date of Patent: Sep. 19, 2006

(54) INTERNAL ATM-BASED MULTI-TERMINAL CLIENT INSTALLATION AND METHOD OF OPERATING SAME

(75) Inventors: Fabrice Bourgart, Perros Guirec (FR); Gilles Ramel, Lannion (FR)

(73) Assignee: France Telecom, Paris (FR)

( * ) Notice: Subject to any disclaimer, the term of this patent is extended or adjusted under 35 U.S.C. 154(b) by 967 days.

(21) Appl. No.: 09/980,483

(22) PCT Filed: May 29, 2000

(86) PCT No.: PCT/FR00/01474

§ 371 (c)(1),
(2), (4) Date: Dec. 3, 2001

(87) PCT Pub. No.: WO00/76255

PCT Pub. Date: Dec. 14, 2000

(30) Foreign Application Priority Data

Jun. 3, 1999 (FR) .................................. 99 07172

(51) Int. Cl.
*H04J 3/02* (2006.01)
(52) U.S. Cl. .................... 370/395.1; 370/420; 370/463; 370/535
(58) Field of Classification Search ............. 370/395.1, 370/419, 420, 462, 463, 535, 537
See application file for complete search history.

(56) References Cited

U.S. PATENT DOCUMENTS

| 5,392,286 | A |  | 2/1995 | Tanaka et al. |
| 5,467,346 | A |  | 11/1995 | Ito et al. |
| 5,504,742 | A |  | 4/1996 | Kakuma et al. |
| 5,513,180 | A | * | 4/1996 | Miyake et al. ............... 370/352 |
| 5,577,032 | A | * | 11/1996 | Sone et al. .................. 370/390 |
| 5,610,914 | A | * | 3/1997 | Yamada .................. 370/395.72 |
| 6,041,359 | A | * | 3/2000 | Birdwell ...................... 709/238 |
| 6,137,793 | A | * | 10/2000 | Gorman et al. ............. 370/360 |
| 6,226,264 | B1 | * | 5/2001 | Shibata et al. ............... 370/232 |
| 6,452,942 | B1 | * | 9/2002 | Lemieux ...................... 370/468 |
| 6,456,962 | B1 | * | 9/2002 | Allingham et al. ........... 703/26 |
| 6,480,487 | B1 | * | 11/2002 | Wegleitner et al. ......... 370/354 |
| 6,510,157 | B1 | * | 1/2003 | Kwok et al. ............. 370/395.2 |
| 6,724,760 | B1 | * | 4/2004 | Uchida ........................ 370/390 |

OTHER PUBLICATIONS

Hiroshi Miyake et al; "System for Supplying a Plurality of ATM Cells"; Jun. 5, 1996; European Publication No. 0 715 470 A2.

* cited by examiner

*Primary Examiner*—Min Jung
(74) *Attorney, Agent, or Firm*—Lowe Hauptman & Berner, LLP

(57) ABSTRACT

A broadcaster broadcasts all network cells received via a receive channel of a telecommunication line serving the installation to digital loops including terminals. A collector collects ATM cells produced by the terminals and transmits them in an emit channel of the line to the network. The broadcaster marks received network cells in order for the collector to eliminate them and not transmit them in the emit channel. ATM intercommunication cells can be produced by terminals and switched by the collector to the broadcaster in order to broadcast them with received network cells to destination terminals of the installation.

17 Claims, 7 Drawing Sheets

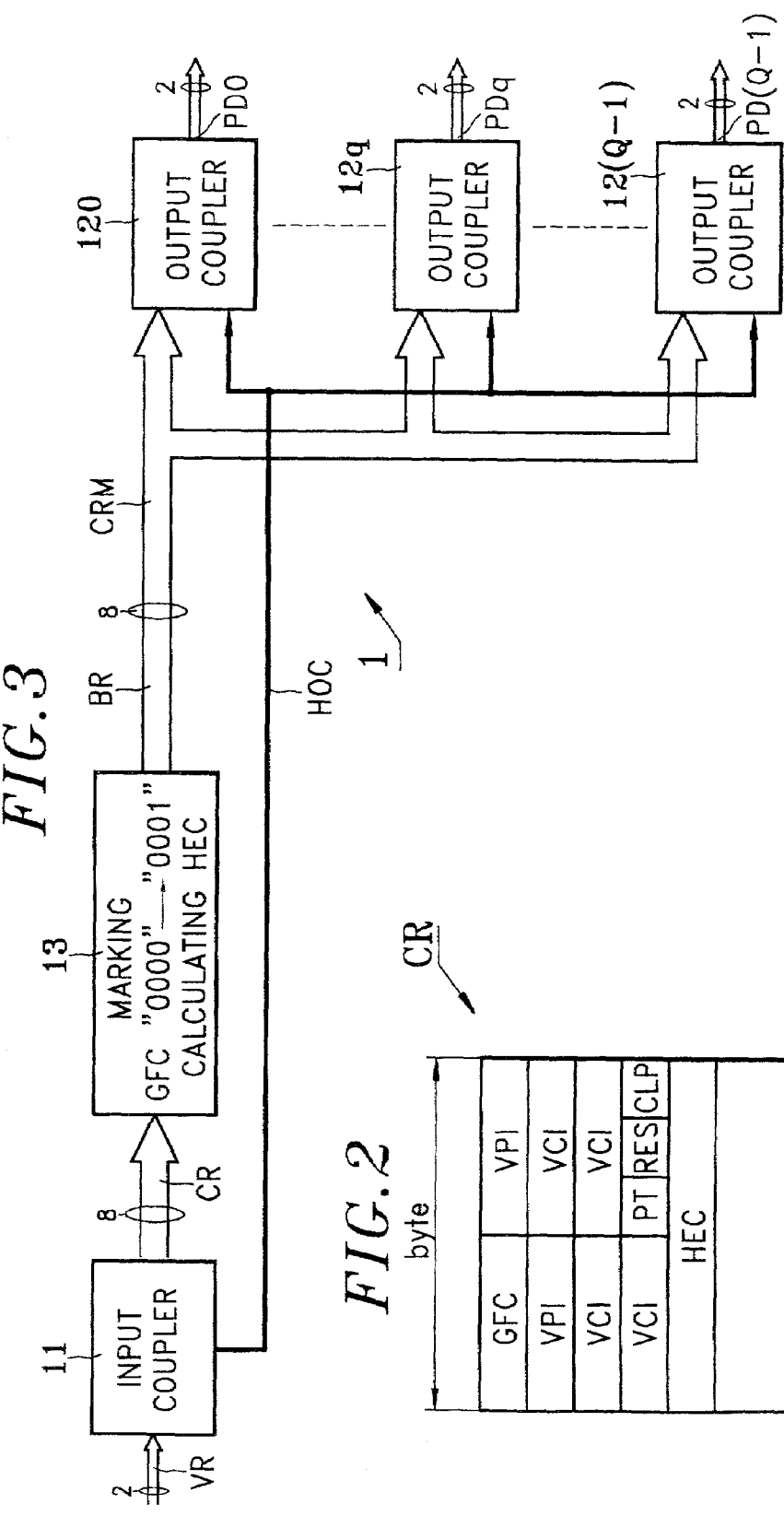

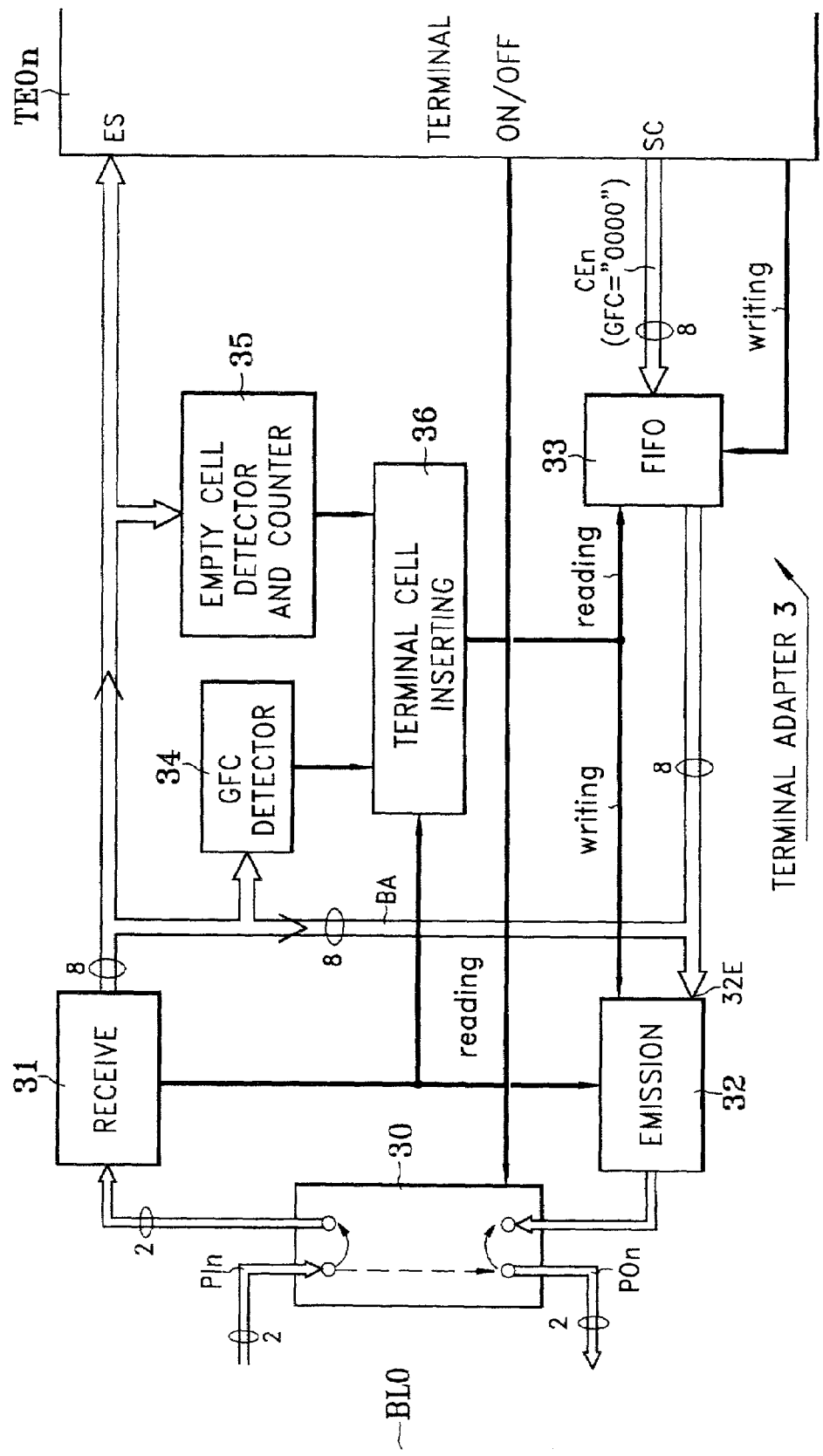

INTERNAL ATM-BASED MULTI-TERMINAL CLIENT INSTALLATION AND METHOD OF OPERATING SAME

RELATED APPLICATIONS

The present application is a national phase application of PCT/FR2000/01474, filed May 29, 2000, which claims priority to French Application Serial Number 99-07172, filed Mar. 6, 1999, the disclosure of which is hereby incorporated by reference herein in its entirety.

BACKGROUND OF THE INVENTION

The present invention relates generally to client terminal telecommunication installations.

OBJECT OF THE INVENTION

It aims to impart the advantages of the asynchronous transfer mode (ATM) transmission technique to digital terminals of a client terminal installation in order to use a single technology to federate at minimum cost the various telecommunication, audiovisual and home automation terminals that a client may possess.

SUMMARY OF THE INVENTION

Accordingly, a terminal installation connected to a telecommunication line conveying network cells in ATM mode and including terminals, is characterized in that it comprises broadcast means for broadcasting all the network cells received via a receive channel of the telecommunication line to the terminals and collection means for collecting cells produced by the terminals and transmitting them in an emit channel of the telecommunication line. The term "broadcast", in contrast to the term "switch" or "demultiplex", indicates that all correct cells coming from the telecommunication line reach a terminal independently of any destination address contained in each cell. The broadcast and collection means together form a single ATM network line termination for the client terminal installation. The size of the ATM cells, and especially the size of the headers of the cells, remains unchanged in the terminal installation of the invention and is that of standardized cells at the user network interface (UNI).

The broadcast means comprises input means for regenerating network cells received via the receive channel in a receive digital link and plural output means connected to the receive link to retransmit synchronously all cells respectively regenerated in plural local loops including at least one terminal. The bit rate in each loop is generally equal to or less than that in the telecommunication line, although it can be greater than the latter in between-terminal intercommunication applications.

The broadcast means and the collection means can be digital local loops in which all received network cells are broadcast. At least one loop includes a terminal, or plural terminals in cascade, and/or at least one other set of broadcast means and collection means. The terminals in a loop, and likewise the sets of broadcast means and collection means, can be cascaded.

The collection means comprises plural input means connected to respective local loops for synchronizing and regenerating cells produced by the respective terminals in the loops, plural buffer memories for cyclically transmitting the regenerated cells in an emit digital link cell by cell by reading only the buffer memories containing at least one cell per cycle, and output means for transmitting cells from the send digital link in the emit channel. Reading the buffer memories cell by cell by skipping empty buffer memories in each cycle is fast and ensures egalitarian access of the local loops to the common emitting link internal to the broadcast means.

Preferably, a means in the broadcast means for marking network cells from the receive channel, and a means in the collection means for eliminating marked network cells broadcast to the terminals are provided in order for the ATM cells locally produced by the terminals to be retransmitted in the ATM network.

According to a preferred embodiment, the marking means is connected between the input means and said plural output means in the receive digital link, and modifies the state of a predetermined field in the header of network cells, then calculate an error control field of the header. The eliminating means prohibits writing of marked network cells in the buffer memories and authorizes writing only of unmarked cells produced by the terminals so that they are transmitted in the emit digital link.

In order not to increase the quantity of internal wiring on the premises of the client and multiple connections to each terminal, the invention provides a between-terminal intercommunication function for the terminals of the installation by means of a few functional add-ons in the broadcast and collection means only. The installation thus comprises means for switching ATM intercommunication cells produced by the terminals from the collection means to the broadcast means in order to broadcast them to the terminals with the received network cells. In order not to increase the cost and complexity of the installation if a plurality of pairs of broadcast and collection means are connected in cascade, as described below, ATM intercommunication cell switching means are provided only in broadcast and collection means connected directly to the telecommunication line of the ATM network.

According to a preferred embodiment, the switching means comprises first means for detecting empty cell locations in the receive digital link, second means for detecting intercommunication cells in response to predetermined first addressing fields read in cells from the emit digital link and cells produced by the terminals in response to predetermined second addressing fields read in cells from the emit digital link, and a buffer memory in which detected intercommunication cells are written under the control of the second detecting means and read under the control of the first detecting means thereby introducing them into empty cell locations in the receive digital link.

Each addressing field can be a virtual channel identifier in the ATM cell header, or more generally at least a portion of a virtual path and virtual channel identifier field VPI/VCI in the header of an ATM cell.

When each terminal can be designated by two different addresses by a network terminal and a terminal of the installation, the switching means comprises means for marking detected intercommunication cells by modifying the state of a predetermined field in the headers of the intercommunication cells and means for calculating error control fields in the headers of the intercommunication cells.

If each terminal can recognize only at least one address (identifier), or even a plural predetermined addresses, the switching means further comprises means for translating first addressing fields of the detected intercommunication cells into second addressing fields using a mapping table.

The predetermined field can be at least a portion of a flow control field in the header of the ATM cells.

According to a preferred embodiment, each terminal is connected to the loop in which it is included, by means of an adapter comprising receiver means for receiving at least broadcast network cells in the loop, means for inserting cells produced by the terminal instead of empty cell locations between received cells by the receiver means, and emitter means for emitting received cells and cells produced by the terminal to the collection means.

Said inserting means for each terminal can comprise means for detecting received cells thereby prohibiting the emitting of any cell produced by the terminal during the transfer of a received network cell between the receiver means and the emitter means, and means for detecting empty cell locations between received cells thereby authorizing insertion of cells produced by the terminal into detected empty cell locations, whilst retaining empty locations available for cells produced by the terminals after said terminal in the loop. Furthermore if the terminal is in cascade with other terminals in a digital local loop between the broadcast means and the collection means, the empty cell location detecting means counts detected empty locations modulo a number of terminals in the loop between said terminal and the collection means, including said terminal, in order to authorize insertion of a cell produced by said terminal only into one of empty cell locations whose number is equal to the number of terminals.

Preferably, the detecting means authorizes insertion of a cell produced by said terminal as a function of the counted number of detected empty locations only if the frequency of the empty cell locations is below a predetermined threshold.

The terminal adapter comprises preferably switching means which authorizes reception of at least broadcast network cells by the receiver means and emission of cells by the emitter means only when the terminal is switched on and makes a direct connection for at least broadcast network cells when the terminal is switched off. The switching means thus hold transmission of the cells in the loop even if a part of the terminals in the loop are switched off.

BRIEF DESCRIPTION OF THE DRAWINGS

Other features and advantages of the present invention will become more clearly apparent on reading the following description of plural preferred embodiments of the invention, which description is given with reference to the corresponding accompanying drawings, in which:

FIG. 2 shows the prior art format of an ATM cell at the client-network interface;

FIG. 3 is a block diagram of an ATM network cell broadcaster included in the installation;

FIG. 4 is a block diagram of an adapter for terminal included in the installation;

DESCRIPTION OF THE PREFERRED EMBODIMENTS

Figure 1:
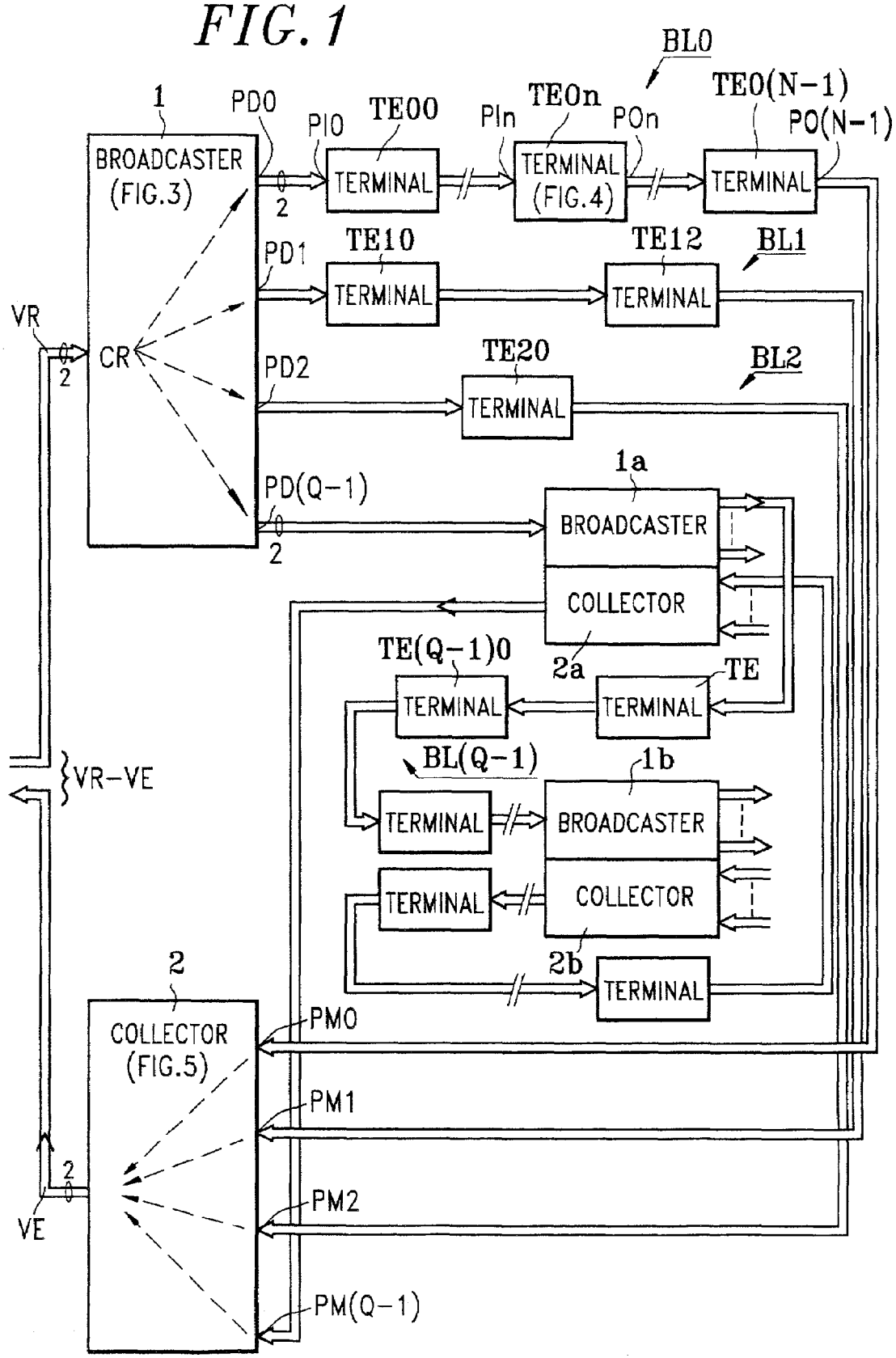
FIG. 1 is a block diagram of an ATM-based multi-terminal client interior installation in accordance with the invention.

Referring to FIG. 1, a multi-terminal client installation served by a duplex digital client telecommunication line VR-VE connected via a digital network termination to an ATM digital switch in an ATM telecommunication network essentially includes an ATM cell broadcast and collection system 1-2 referred to as a replicator-router and at least one plurality of terminals TE distributed around the premises of the client, such as the rooms of the home of the client, for example. A terminal TE can be a microcomputer, a home automation control and/or surveillance system, a local server, a digital telephone, a cable television receiver, etc.

For example, the telecommunication line VE-VR is made up of two balanced metal wire pairs VE and VR and is connected to an ISDN or ADSL network digital termination, for example. The first pair of the line constitutes a physical receive channel VR for conveying a flow of ATM network cells CR transmitted from the ATM switch to a cell broadcaster 1 included in the replicator-router. The broadcaster broadcasts in the downlink direction cells received and processed via Q output ports PD0 to PD(Q−1) serving the terminals TE directly or indirectly. The second pair of the line constitutes a physical emit channel VE for conveying a flow of ATM cells transmitted from the terminals to Q input ports PM0 to PM(Q−1) of a cell collector 2 included in the replicator-router. The collector collects cells transmitted by the terminals in the uplink direction.

The pairs of ports PD0–PM0 to PD(Q−1)–PM(Q−1) form ends of digital transmission local loops BL0 to BL(Q−1), each of which serves at least one terminal and, in the example shown, consists of a pair of metal wires. However, instead of this, all or part of a local loop can consist of a multimode or monomode plastics material optical fiber with appropriate electro-optical and opto-electrical converters in the couplers at the ends of the loop and in the adapters associated with the terminals included in the loop; this alternative eliminates from the local loop electrical interference emanating from high-current electrical wires in the electrical installation of the client routed in the vicinity of the transmission local loop. Another alternative is for all or part of a local loop to consist of a radio link.

To provide an example to which reference will be made in the remainder of the description, the bit rate in the telecommunication line VR-VE and in the loop links between terminals TE is 32 Mbit/s and corresponds to a predetermined bit rate of (⅘)32=25.6 Mbit/s following 5B–4B binary transcoding in the broadcaster 1 and 4B–5B binary transcoding in the collector 2. In other embodiments the bit rate is significantly higher, for example equal to 155.52 Mbit/s in the broadcaster and the collector and in the terminal adapters described later.

In the embodiment shown in FIG. 1, Q=4 local loops with wire pairs BL0 to BL(Q−1)=BL3 are respectively connected by pairs of ports PD0–PM0 to PD(Q−1)–PM(Q−1) =PD3–PM3 and intentionally include several examples of local loop architectures.

The first local loop BL0 includes N digital terminals TE00 to TE0(N−1) connected in cascade. As seen hereinafter, each terminal is equipped with an adapter 3 connected to the loop. The first terminal TE00 in the downlink direction has an adapter input port PI0 connected to the broadcaster output port PD0 and the last terminal TE0(N−1) has an adapter output port PO(N−1) connected to the collector input port PM0. A terminal TE0n in the loop BL0, where 0<n<N−1, has an adapter input port PIn connected to the adapter output port relating to the preceding terminal TE0(n−1) via a pair of transmission wires and to an adapter output port POn connected to the adapter input port relating to the next terminal TE0(n+1) via a pair of transmission wires.

In other examples of local loops, the loop BL1 includes a few terminals TE11 and TE12 and the loop BL2 includes only one terminal TE20. The ATM installation has a star architecture.

Like the terminals, replicators-routers in accordance with the invention can be cascaded. For example, the last local loop BL(Q−1) includes a second replicator-router 1a-2a in which the input port of the broadcaster 1a and the output port of the collector 2a are respectively connected to the output port PD(Q−1) of the broadcaster 1 and to the input port PM(Q−1) of the collector 2 via a terminal TE(Q−1)0. For example, the second replicator-router 1a-2a serves a plurality of local loops, one of which is shown in FIG. 1 and includes a third replicator-router 1b-2b in accordance with the invention in cascade with a plurality of terminals, the other loops served by the replicators-routers 1a-2a and 1b-2b each being able to include at least one terminal TE and/or one replicator-router.

In accordance with the invention, some fields of the ATM cells are processed in the replicator-router. The format of an ATM cell is briefly described below with reference to FIG. 2, essentially in relation to the functions necessary for the replicators-routers and local loops of the invention.

An ATM cell includes a 5-byte header and a payload field with a constant size of 48 bytes.

The first field of the header is a generic flow control (GFC) field on four bits. The value "0000" is included by default in all network cells CR delivered by the ATM local switch via the receive channel VR of the telecommunication line.

The next six half-bytes in the cell header are occupied by an addressing field VPI/VCI containing a virtual path identifier (VPI) on eight bits and a virtual channel identifier (VCI) on two bytes. In a client installation, a virtual path consists of the client telecommunication line VR-VE and the ATM local switch is therefore a virtual path cross-connect switch. The field VCI contains the address of a destination terminal TE included in the installation and provides end-to-end point-to-point communication between two distant terminals.

In other embodiments, the identifiers of the installation and of a terminal of the installation, or only the identifier of a terminal, independently of the installation including it, are distributed over a portion of the whole of the addressing field VPI/VCI as a function of addressing plans drawn up by the operators and the installation manufacturers.

The second half-byte of the fourth byte in the header includes three fields PT, RES and CLP that are not relevant to the invention.

The fifth and final byte of the header of an ATM cell constitutes a header error control (HEC) field. Before sending the cell, the content of the field HEC is computed by a predetermined algorithm as a function of the first four bytes of the cell and, after the cell is received, is used to correct single errors in the header of the received cell to reject the cell if more than one error is detected in the cell or if errors are detected in a predetermined number of consecutive cells of the same logical channel VPI/VCI. If it is correct, the field HEC is also used as a cell delimiter.

The broadcaster 1 of a replicator-router of the invention is a replicator that broadcasts the ATM cells received via the receive channel VR of the telecommunication line to the local loops BL0 to BL(Q−1), i.e. which copies each received network cell CR into each local loop in the downlink direction.

As shown in FIG. 3, the broadcaster 1 includes an input coupler 110 and Q output couplers 120 to 12(Q−1).

The input coupler 11 handles transcodes, descrambles, extracts the frame configuration from the cells and regenerates the incoming flow at 32 Mbit/s to produce an internal flow at 25.6 Mbit/s using a 5B–4B transcoder, by eliminating predetermined bytes used for detecting cell frames and for realigning received ATM cells. The coupler 11 recovers a 32 MHz clock signal and, after dividing its frequency, applies a cell byte clock signal HOC at 25.6/8=3.2 MHz to all the output couplers 120 to 12(Q−1). The signal HOC is synchronous with bytes of received 53-byte ATM cells transmitted by the input coupler 11 in an internal digital receive link bus BR on eight conductors broadcasting the bytes of received cells to input ports of the output couplers.

Synchronously with the clock signal HOC, the output couplers 120 to 12(Q−1) convert each parallel cell byte into eight serial bits, frame the cells, scramble and transcode according to the 4B–5B code the flow of cells broadcast in the local loops BL0 to BL(Q−1) via the output ports PD0 to PD(Q−1) in the downlink direction.

Broadcasting cells proper requires no a priori change to the header of each cell. In particular, the network cell field GFC="0000" and the addressing fields VPI/VCI can be retained as the network cells pass through the broadcaster 1.

As far as any terminal TE0n in a local loop, such as the loop BL0, a terminal adapter 3 shown in FIG. 4 is included in front of each terminal denoted TE0n.

Like the coupler 11 of the broadcaster, a receive circuit 31 of the adapter transcodes into the 5B–4B code, descrambles, extracts the frame configuration from the cells and regenerates the incoming loop flow at 32 Mbit/s to produce an internal flow at 25.6 Mbit/s. The circuit 31 converts the bytes into parallel form and directs byte by byte all the ATM cells that are transmitted by the respective input coupler 120 in the broadcaster 1 in the downlink direction, and where applicable the cells produced by at least one preceding terminal TE0(n−1), to a cell input port ES of the terminal proper TE0n, which samples the cells that have been emitted to it as a function of the virtual channel identifier VCI, and to an input port 32E of an emitting circuit 32 via an eight-conductor bus BA internal to the adapter. The cells received in the circuit 31 and ATM cells CEn produced by the terminal proper TE0n via a cell output port SC and an uplink cell FIFO buffer memory 33 are mixed in the bus BA and pass through the emitting circuit 32 to be transmitted to the collector input port PMO, where applicable through at least one terminal TE0(n+1). Like each output coupler 12q of the broadcaster 1, the emitting circuit 32 serializes the cell bytes, configures into frames the cells transmitted by the circuit 31 and the terminal TE0n, scrambles them and transcodes them into the 4B–5B code.

In practice, the loop ports PIn and POn of the adapter 3 are respectively connected to the input of the receive circuit 31 and to the output of the emitting circuit 32 via a four-port switch 30 when the terminal TE0n is operating, in response to a control signal in an "ON" state delivered by the terminal TE0n when it is switched on. If the terminal TE0n is switched off, the control signal is in an "OFF" state and the switch 30 is in an idle position to connect the ports PIn and POn directly for broadcast network cells and cells produced by the preceding terminals TE00 to TE0(n−1), without the cells in the loop BL0 passing through the internal circuits 31 and 32 of the adapter.

In the adapter 3, means is intended for inserting cells CEn produced by the terminal in empty cell locations between cells received by the circuit 31, leaving empty cells available for the subsequent terminals TE0(n+1) to TE0(N−1) in the loop BL0. The aforementioned means include a GFC field detector 34, an empty cell detector/counter 35 and a terminal cell inserting circuit 36. The detector 34 detects cells "full" of data having a flow control field GFC at "0000" (or "0001", see below) transmitted by the ATM network via the broadcast port PD0 and where applicable cells with the field GFC="0000" produced by the preceding terminals TE0 to TE(n−1), so that the circuit 36 prohibits reading of terminal cells CEn already written by the terminal TEOn in the FIFO memory 33 during retransmission of each received cell from the receive circuit 31 to the emitting circuit 32. The detector/counter 35 detects empty cells, i.e. empty cell locations, between the "full" cells and counts the empty cells detected modulo (N−n+1) so that the circuit 36 authorizes the reading of a terminal cell CEn in the FIFO memory 33 and the insertion of this read cell every (N−n+1) empty cells detected in the downlink flow of cells transmitted on the bus BA by the circuit 31. Of the (N−n+1) empty cells, N−n empty cells in the outgoing flow of cells from the emitting circuit 32 are available to be replaced by cells produced by the subsequent terminals TE0(n+1) to TE0N.

The empty cell detector/counter 35 preferably activates the cell inserting circuit 36 only if the frequency of empty cells is below a predetermined threshold, i.e. the empty cell resource at the adapter input port PIn is becoming rarified, in order to avoid non-use of empty cells.

In another embodiment, if the loop includes only one terminal, like the loop BL2 with the terminal TE20, the circuits 33 to 36 can be dispensed with, and likewise the eight-conductor loop bus BA between the receive and send circuits 31 and 32.

Figure 5:
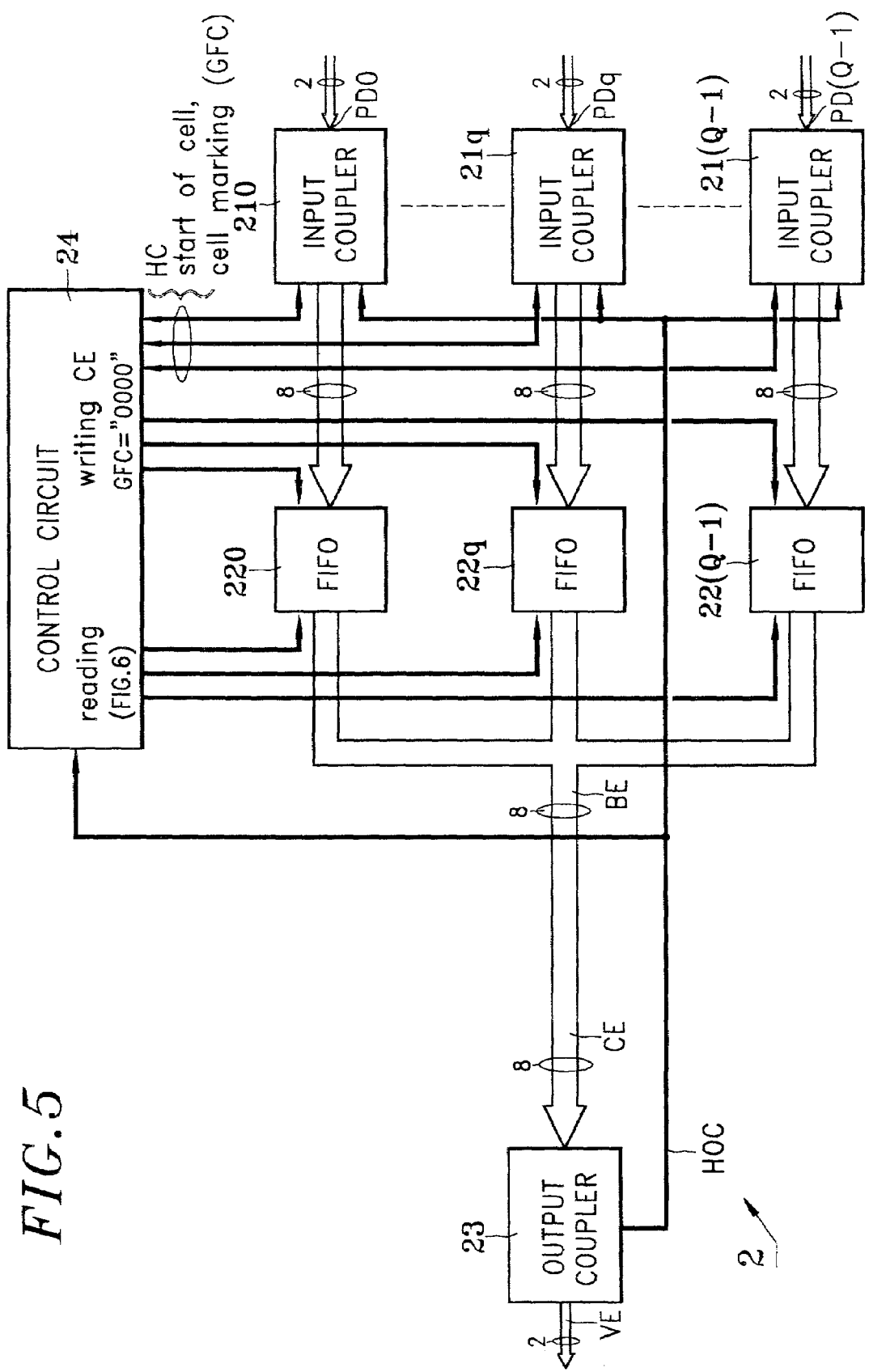
FIG. 5 is a block diagram of an ATM network cell collector included in the installation.

The collector 2 of the replicator-router 1-2 is shown in detail in FIG. 5 and includes Q input couplers 210 to 21(Q−1) connected to the collector input ports PM0 to PM(Q−1), Q FIFO buffer memories 220 to 22(Q−1) connected to the input couplers by parallel-bit byte buses, an output coupler 23 connected to the FIFO memory outputs by a send digital link bus BE for parallel-bit bytes, and a control circuit 24. The input couplers 210 to 21(Q−1) handle 5B–4B transcoding, descrambling, extraction of the frame configuration from the cells and regeneration of the uplink flow of cells transmitted by the loops. They receive asynchronously cells CR coming the ATM network and broadcast by the broadcaster 1 and cells CE produced by the terminals which are transmitted via the uplink channels of the local loops BL0 to BL(Q−1), indicating the beginning of the received cells CR and CE to the control circuit 24, and regenerating and synchronizing the cells received using a byte clock signal HOC at 3.2 MHz provided by the output coupler 23 or by the input coupler 11 of the broadcaster 1. The control circuit 24 therefore writes cells CR and CE byte by byte and in synchronism with the byte clock into the memories 220 to 22(Q−1).

The ATM cells collected by the FIFO memories 220 to 22(Q−1) are routed equitably in the common emit digital link bus BE to the output coupler 23 under the control of the circuit 24 to prevent cells overlapping because the incoming flows into the FIFO memories and the outgoing flows from them in the bus BE are at 3.2 Mbyte/s and to empty the FIFO memories quickly in turn and cell by cell.

Figure 6:
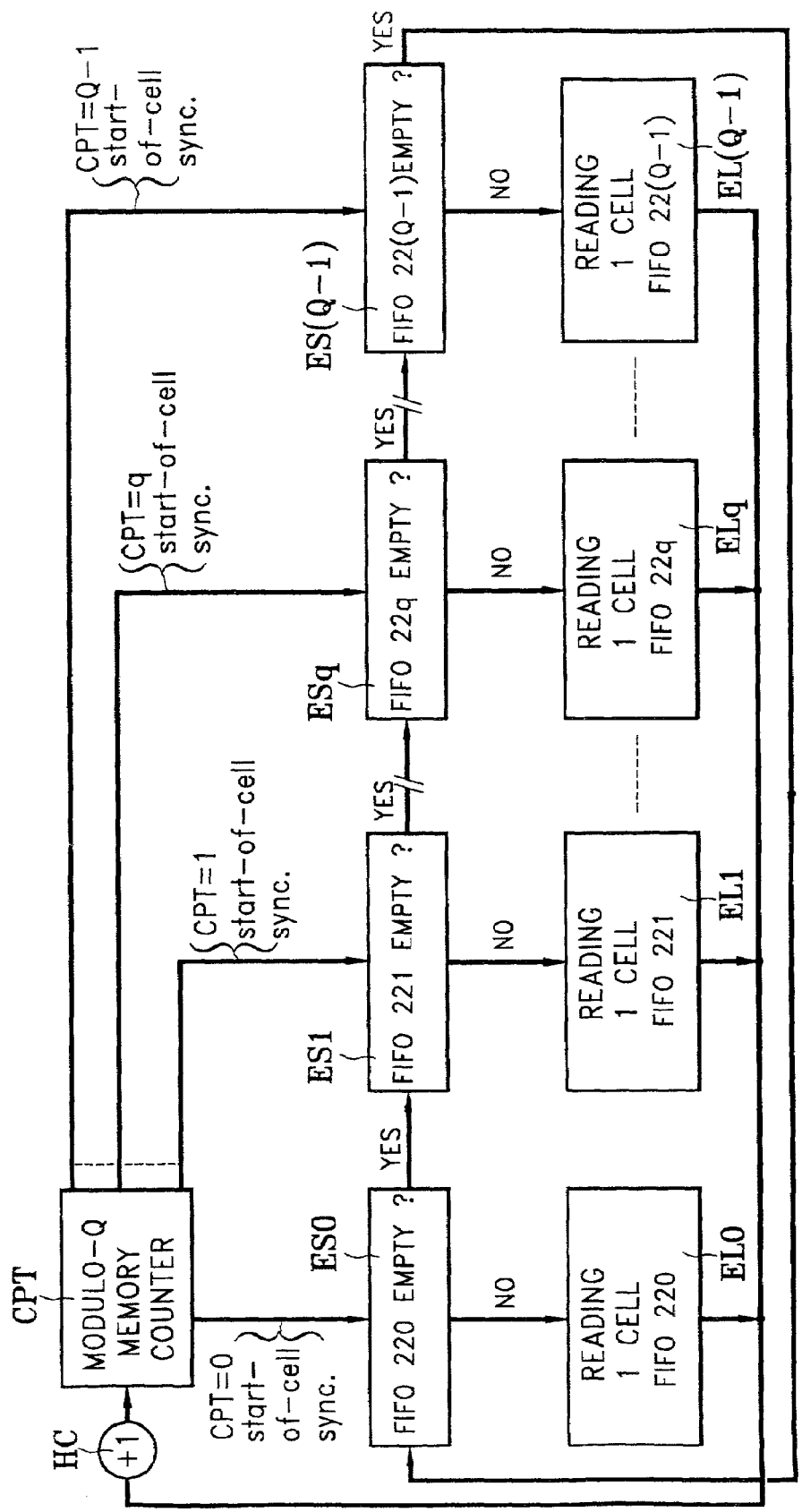
FIG. 6 is an algorithm for scanning buffer memories in the collector.

The FIFO memories 220 to 22(Q−1) are read in accordance with the algorithm shown in FIG. 6. A modulo-Q memory counter CPT is incremented by one unit in response to a start-of-cell clock signal HC at the 53-byte cell frequency synchronized with the signal HOC and fed to the input couplers. On each pulse of the start-of-cell signal HC, the content of one 22q of the FIFO memories is scanned in a scanning step ESq, where $0 \leq q \leq Q-1$. If the memory 22q contains at least one cell, the circuit 24 controls reading of the first cell written into that memory and transmission thereof in the bus BE byte by byte during a reading step ELq; the counter CPT is then incremented by one unity to read the next memory 22(q+1) during a scanning step ES(q+1), and so on. If there are no cells in the memory 22q in step ESq, the algorithm scans the next memory 22(q+1) without waiting for the next pulse of the start-of-cell clock signal HC, and so on, right through a memory containing a cell to read, or until all the memories have been scanned before the counter CPT is incremented; this algorithm prevents the unnecessary allocation of empty cell locations in the send bus BE to a local loop which has no terminal cells to emit.

Returning to FIG. 5, the output coupler 23 performs operations that are the reciprocal to those performed by the input coupler 11 of the broadcaster. It converts bytes in the bus BE to serial bits, configures the ATM cell frames, scrambles and transcodes into 4B–5B code the cells read in the FIFO memories 220 to 22(Q−1), collected and multiplexed in the internal bus BE at the predetermined bit rate of 25.6 Mbit/s to retransmit them in the emit channel VE of the telecommunication line at the bit rate of 32 Mbit/s.

In the embodiment described above, network cells CR received from the line receive channel VR in the input coupler 11 of the broadcaster 1 and travelling through the local loops BL0 to BL(Q−1) are retransmitted in the ATM network by the input couplers 210 to 21(Q−1) of the collector 2 to the line emit channel VE. To prevent this retransmission of cells received by the installation, the flow control field GFC of network cells CR received initially in the state "0000" by the broadcaster 1 is replaced by a predetermined state, for example "0001", in a network cell marking and error control field calculating circuit 13 inserted into the bus BR between the output port of the coupler 11 and the input ports of the couplers 120 to 12(Q−1), as shown in FIG. 3. Because the header of the network cells is modified, the error control field HEC of each marked network cell CRM is recalculated in the circuit 13. Returning to FIG. 5, each of the collector input couplers 210 to 21(Q−1) detects marked network cells CRM with a field GFC="0001" retransmitted by the loops and reports them to the control circuit 24. In the FIFO memories 220 to 22(Q−1), the circuit 24 prohibits writing of marked network cells CRM by a field GF="0001" and authorizes only writing of cells CE with a field GF="0000" produced by terminals in the local loops BL0 to BL(Q−1).

Figure 7:
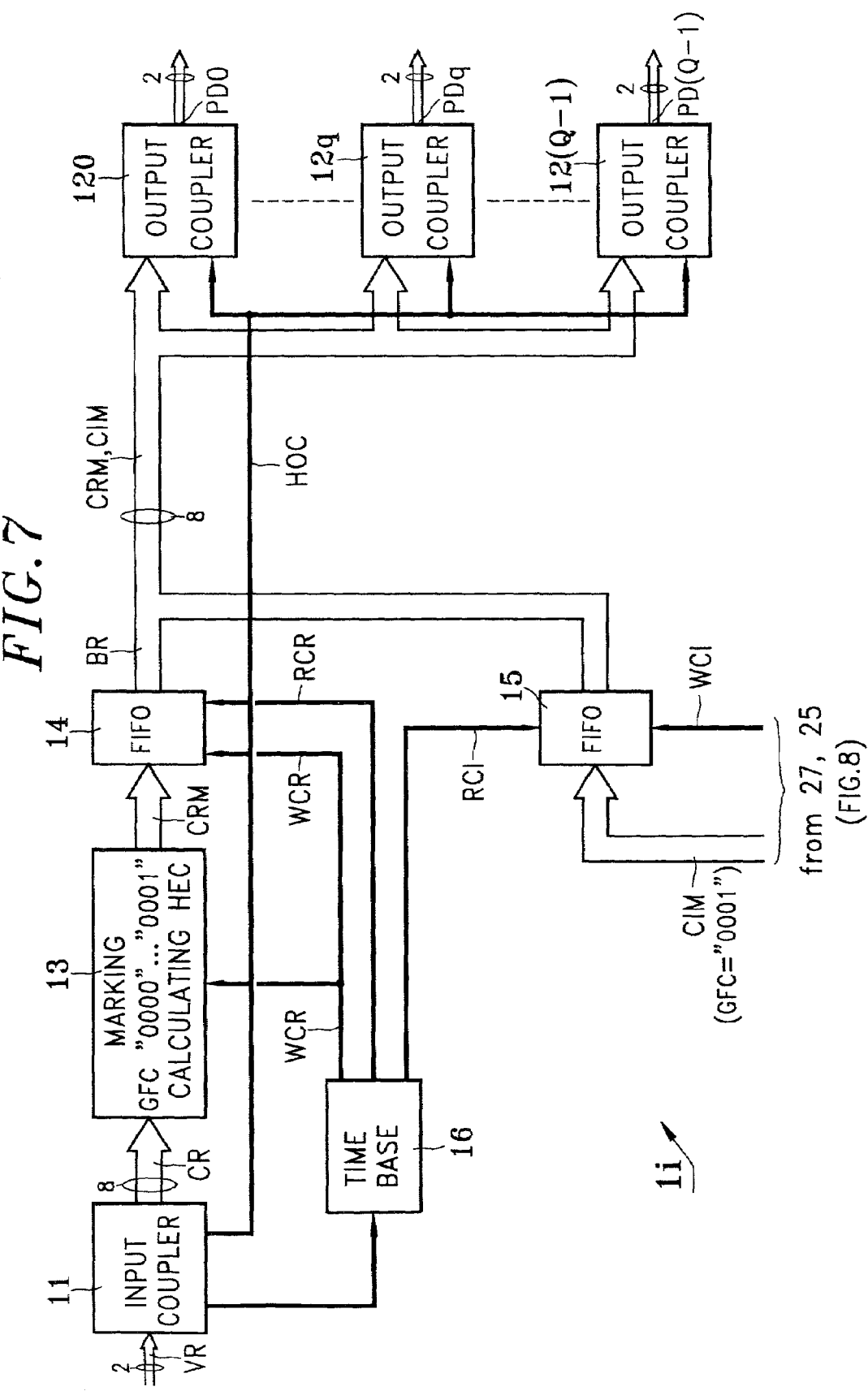
FIG. 7 is a block diagram of an ATM network cell and ATM intercommunication cell broadcaster in accordance with a second embodiment.
Figure 8:
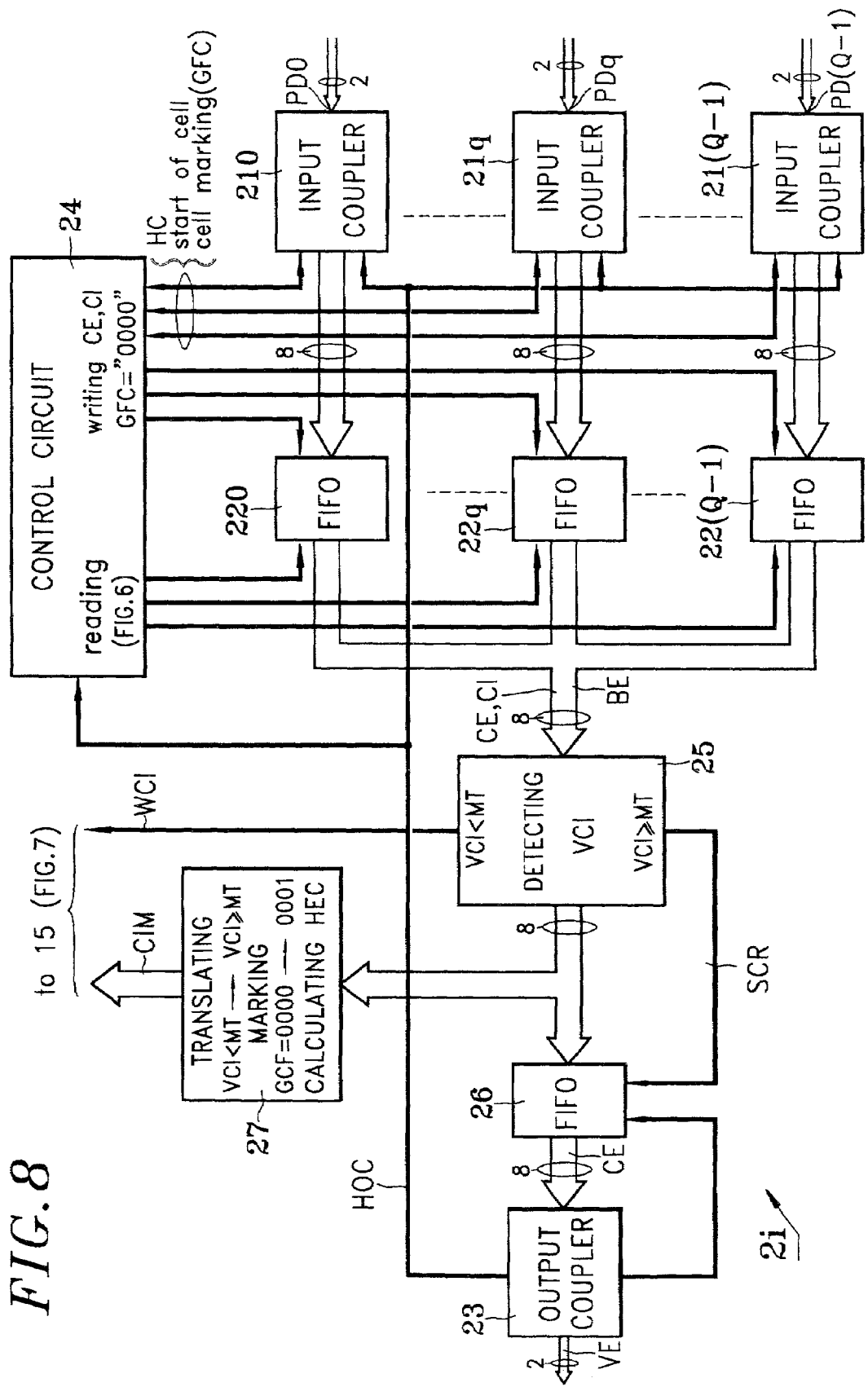
FIG. 8 is a block diagram of an ATM network cell and ATM intercommunication cell collector in accordance with the second embodiment.

Referring to FIGS. 7 and 8, the replicator-router 1-2 is replaced by a replicator-router 1i-2i which re-injects intercommunication cells CI produced at the outputs of the terminals of the loops, such as the output port SC of the terminal TE0a (FIG. 4), to other terminals of the loops for point-to-point intercommunication within the client installation. The intercommunication cells CI produced have a flow control field GFC="0000" and are not marked beforehand like the network cells CRM intended for the terminals. Nevertheless, intercommunication cells CI are distinguished from cells CE produced by the terminals so that, in the collector 2i, the intercommunication cells CI are switched to the broadcaster 1i and the cells CE produced by the terminals are directed to the line emit channel VE. This distinction lies in the virtual channel identifier VCI of the addressing field VPI/VCI which, in the embodiment described, is greater than or equal to a predetermined number MT=32 for network cells CR received via the receive channel VR and cells CE produced by the terminals and which, according to the invention, is strictly less than MT=32 for the intercommunication cells CI. The parameter MT determines the maximum number of terminals in the installation that can participate in intercommunications.

In a first embodiment of intercommunication, it is assumed that each terminal TE of the installation recognizes only one identifier VCI which is normally assigned to it by any terminal sending cells addressed to the terminal of the installation.

The broadcaster 1*i* shown in FIG. 7 and the collector 2*i* shown in FIG. 8 include the couplers 11 and 120 to 12(Q−1), the network cell marking and error control field calculating circuit 13, and the couplers 210 to 21(Q−1) and 23, the FIFO buffer memories 220 to 22(Q−1) and the control circuit 24 which eliminates marked cells having a field GFC="0001" and which have travelled through the loops, in order not to write them into the FIFO memories, and which controls writing and reading in the FIFO memories only of cells transmitted by the terminals of the installation according to the FIG. 6 algorithm.

The broadcaster 1*i* shown in FIG. 7 further includes a marked cell FIFO memory 14, an intercommunication cell FIFO memory 15, and a receive time base 16 which is partly included in the input coupler 11 shown in FIG. 3. The marked cell memory 14 is interconnected in the 8-conductors receive bus BR at 3.2 MHz internal in the broadcaster between the circuit 13 and the input ports of the output couplers 120 to 12(Q−1). An 8-output port of the intercommunication cell memory 15 is connected to the receive bus BR in order to be able to introduce intercommunication cells to be broadcast in the local loops BL0 to BL(Q−1) into empty cell locations between the network cells received, i.e. between the marked cells CRM. The time base 16 receives a start-of-network-cell CR signal established by the input coupler 11 in order to produce systematically a write control signal WCR for writing into the memory 14 the marked network cells CRM supplied by the circuit 13 and a read control signal RCR for reading the network cells in the memory 14 at the rhythm at which cells are broadcast in the installation. The input coupler 11 also signals empty cell locations between the network cells CR received in the receive channel VR to the time base 16 which generates a read control signal RCI for reading intercommunication cells in the memory 15 and introducing them between marked network cells CRM in the receive bus BR.

The collector 2*i* shown in FIG. 8 further includes a virtual channel identifier detecting circuit 25, an unmarked network cell FIFO memory 26, and a virtual channel identifier translating, cell marking and error control field calculating circuit 27. The detecting circuit 25 and the memory 26 are connected in cascade in the 8-conductors emit bus BE internal in the collector, between the 8-output ports of the FIFO memories 220 to 22(Q−1) and the 8-input port of the output coupler 23. The circuit 27 is connected between the 8-output port of the detecting circuit 25 and the 8-input port of the memory 15 in the broadcaster 1*i*.

The circuit 25 distinguishes, among the cells produced by the terminals in the client telecommunication installation, network cells CE addressed to distant terminals and to be transmitted via the emit channel VE of the telecommunication line and intercommunication cells CI addressed to terminals of the installation and to be broadcast by the broadcaster 1*i*. In response to a virtual channel identifier VCI greater than or equal to the predetermined number MT=32 detected in a cell read in one of the memories 220 to 22(Q−1), the detecting circuit 25 applies a write control signal SCR to the FIFO memory 26 so that the read cell is written as an unmarked network cell CE with a field GFC="0000" into the memory 26 and is then read under the control of the output coupler 23 in order to transmit it in the line emit channel VE.

If the identifier VCI detected is such that VCI<MT, the detecting circuit 25 applies a write control signal WCI to the FIFO memory 15 (FIG. 7) so that the cell read in one of the memories 220 to 22(Q−1) is processed as an intercommunication cell CI in the circuit 27 and then written into the memory 15 pending its insertion between marked network cells CRM in the receive bus BR of the broadcaster 1*i*. In the circuit 27, the identifier VCI<MT in the intercommunication cell CI to be processed is translated into a virtual channel identifier VCI more than or equal to MT and corresponding to the terminal of the installation to which the cell read is addressed, using a programmable virtual channel mapping table relating identifiers VPI<MT and identifiers VPI≧MT=32. The flow control field GFC="0000" of the cell CI is translated to "0001" in the circuit 27. The mapping table can be programmed by a predetermined terminal of the installation sending the circuit 27 cell messages with the routing address of the circuit 27. The intercommunication cells CI therefore become marked cells CIM, in the same way as the marked network cells CRM in the broadcaster 1*i*, and are therefore eliminated by the circuit 24 after passing through all of the loops of the installation. Since the translated identifier VPI and the translated control field GFC modify the header of the intercommunication cell CI, its error control field HEC is therefore recalculated in the circuit 27. The marked intercommunication cell CIM written in the memory 15 therefore contains an identifier VCI and fields GFC and HEC different from those in the intercommunication cell CI detected by the circuit 25.

In a second embodiment of intercommunication, each terminal TE of the installation can recognize two identifiers VCI which are different or, as already stated, which can be included each in the addressing field VPI/VCI of a cell. The first identifier is that normally allocated by a distant terminal sending network cells through the receive channel VR and is greater than or equal to MT=32. According to the invention, the second identifier is that allocated by a terminal of the installation requiring to transmit ATM intercommunication cells to another terminal of the installation and is strictly less than MT.

For this second embodiment, the identifier translation function in the translating, marking and calculating circuit 27 is eliminated, and the intercommunication cells CI retain their identifier on being transferred from the emit bus BE of the collector 2*i* to the receive bus BR in the broadcaster 1*i* via the circuits 25 and 27 and the memory 15.

The invention claimed is:

1. A terminal installation adapted to be connected to a telecommunication line for conveying network cells in ATM mode, said installation comprising:

terminals, a cell broadcast arrangement including an input arrangement for regenerating network cells received via a receive channel of said telecommunication line in a receive digital link, and a plurality of output arrangements coupled to the receive digital link for transmitting synchronously all cells respectively regenerated into a plurality of local loops including said terminals, and a cell collection arrangement including a plurality of input arrangements respectively coupled to said local loops for synchronizing and regenerating cells produced by said terminals in said loops for thereby producing regenerated cells, a plurality of buffer memories for cyclically transmitting said regenerated cells in an emit digital link cell by cell by reading only the buffer memories including at least one cell per cycle, and an output arrangement for transmitting cells from said emit digital link in an emit channel of said telecommunication line.

2. A terminal installation according to claim 1, wherein said broadcast arrangement comprises a processor arrangement for marking network cells from the receive channel, and said collection arrangement comprises a processor arrangement for eliminating marked network cells broadcast to the terminals for preventing retransmission of the marked network cells in said emit channel.

3. A terminal installation according to claim 1, wherein said broadcast arrangement comprises a processor arrangement coupled between said input arrangement and said plurality of output arrangements in said receive digital link for modifying the state of a predetermined field in the header of network cells and then calculating an error control field of the header, and said collector arrangement comprises a processor arrangement for prohibiting writing of marked network cells in said buffer memories and authorizing writing only of unmarked cells produced by the terminals in said buffer memories so that only said unmarked cells are transmitted in said emit digital link.

4. A terminal installation according to claim 3, wherein said predetermined field includes at least a portion of a flow control field.

5. A terminal installation according to claim 1, comprising a switch arrangement for switching ATM intercommunication cells produced by said terminals from said collection arrangement to said broadcast arrangement in order to broadcast said intercommunication cells to said terminals with the received network cells.

6. A terminal installation according to claim 1, comprising a detector arrangement for detecting (a) empty cell locations in said receive digital link, and (b) intercommunication cells produced by said terminals in response to predetermined first addressing fields read in cells from said emit digital link and cells produced by said terminals in response to predetermined second addressing fields read in cells from said emit digital link, and a buffer memory in which detected intercommunication cells are written in response to detection of (b), and read in response to detection of (a) for thereby introducing said intercommunication cells into said empty cell locations in said receive digital link.

7. A terminal installation according to claim 6, wherein each addressing field includes at least a portion of a virtual path and virtual channel identifier field in the header of an ATM cell.

8. A terminal installation according to claim 6, comprising a processor arrangement for (a) marking the detected intercommunication cells by modifying the state of a predetermined field in the header of said intercommunication cells and (b) calculating error control fields in said headers of the intercommunication cells.

9. A terminal installation according to claim 8, wherein the processor arrangement is arranged for translating first addressing fields of said detected intercommunication cells into second addressing fields in accordance with a mapping table.

10. A terminal installation according to claim 1, wherein said broadcast arrangement and said collection arrangement are coupled by digital local loops for broadcasting all received network cells, at least one of the loops including at least one other set of broadcast arrangements and collection arrangements.

11. A terminal installation according to claim 1, wherein each terminal is coupled to a receiver arrangement for receiving at least network cells broadcast from said broadcast, a processor arrangement for inserting cells produced by the terminal into empty cell locations between the broadcast network cells, and an emitter arrangement for emitting said broadcast network cells and said cells produced by said terminal to said collection means.

12. A terminal installation according to claim 11, wherein said processor arrangement for inserting for each terminal comprises a detector arrangement for detecting broadcast network cells, and for thereby prohibiting the emitting of any cell produced by said terminal during a transfer of a broadcast network cell between said receiver arrangement and said emitter arrangement, the detector arrangement being arranged for detecting empty cell locations between said broadcast network cells for thereby authorizing insertion of cells produced by said terminal into detected empty cell locations.

13. A terminal installation according to claim 12, wherein, said terminal is in cascade with other terminals in a digital local loop between said broadcast arrangement and said collection arrangement, said detector arrangement for detection of empty cell location is arranged to count detected empty locations modulo the number of terminals in said digital local loop between said terminal and said collection arrangement including said terminal, in order to authorize insertion of a cell produced by said terminal only into an empty cell location whose number is equal to said number of terminals.

14. A terminal installation according to claim 13, wherein said detecting arrangement for the empty cell location is arranged to authorize insertion of said cell produced by said terminal as a function of a counted number of said detected empty locations only if said empty cell locations have a frequency below a predetermined threshold.

15. A terminal installation according to claim 11, including a switching arrangement for authorizing reception of at least broadcast network cells by said receiver arrangement and emission of cells by said emitter arrangement only while said terminal is switched on, and for making a direct connection for at least broadcast network cells while said terminal is switched off.

16. A method of operating a terminal installation connected to a telecommunication line conveying network cells in ATM mode, the installation including terminals, a broadcast arrangement and a collection arrangement, the method comprising:

regenerating network cells received via a receive channel of the telecommunication line in a receive digital link to produce first regenerated cells;

broadcasting from the broadcast arrangement to said terminals all the first regenerated;

synchronously transmitting all the first regenerated cells into a plurality of local loops;

collecting, at the collection arrangement, the first regenerated synchronously transmitted cells;

at the collection arrangement synchronizing and regenerating the first regenerated cells to produce second regenerated cells, and cyclically transmitting the second regenerated cells cell by cell by reading at least one cell per cycle from a memory; and transmitting the collected cells in an emit channel of the telecommunication line.

17. A method of operating a terminal installation connected to a telecommunication line conveying network cells in ATM mode, the method comprising:

regenerating network cells received by the terminal installation via a receive channel of the telecommunication line in a receive digital link to produce first regenerated cells;

broadcasting from the terminal installation to terminals of the installation all the first regenerated cells;

synchronously transmitting all the first regenerated cells into a plurality of local loops;

collecting, at the terminal installation, the first regenerated synchronously transmitted cells;

at the collection arrangement synchronizing and regenerating the first regenerated cells to produce second regenerated cells, and cyclically transmitting the second regenerated cells cell by cell by reading at least one cell per cycle from a memory; and transmitting from the terminal installation the collected cells in an emit channel of the telecommunication line.

* * * * *